W. N. KILBY & S. W. KERR.
PLANTER SHOE TRUCK.
APPLICATION FILED AUG. 23, 1909.
941,421.
Patented Nov. 30, 1909.
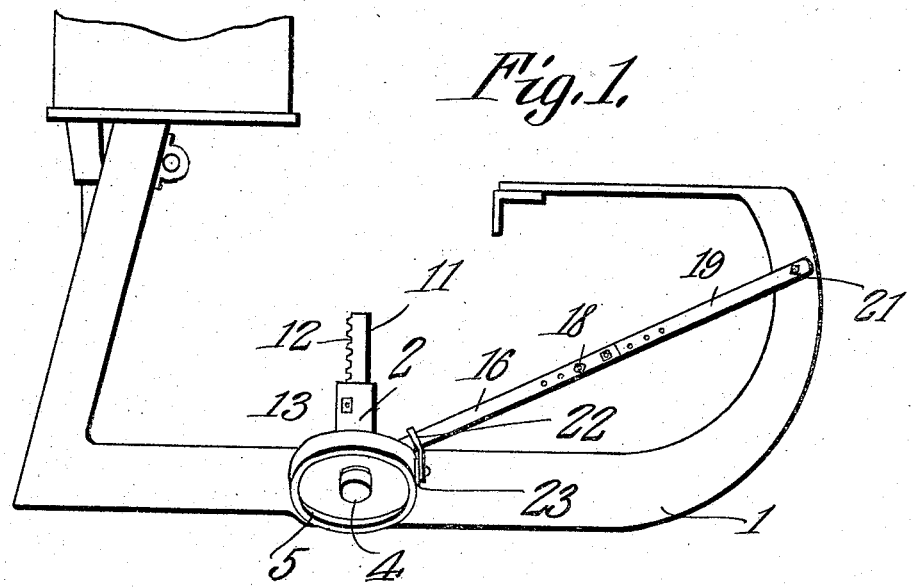
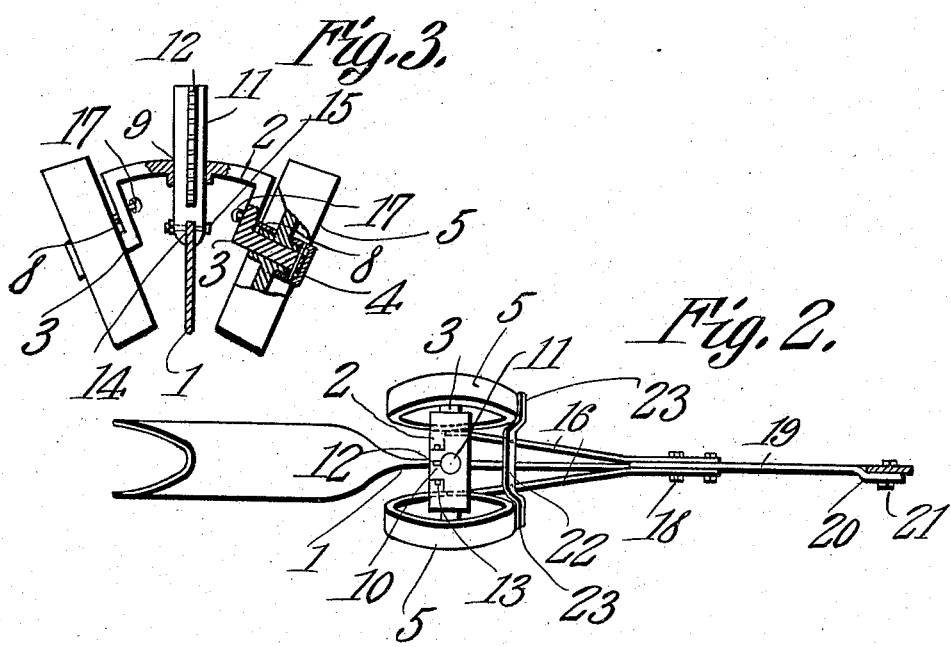
Witnesses
Inventors
Wirt N. Kilby
Samuel W. Kerr
By C. A. Snow & Co.
Attorneys

UNITED STATES PATENT OFFICE.

WIRT N. KILBY AND SAMUEL W. KERR, OF LANCASTER, WISCONSIN.

PLANTER-SHOE TRUCK.

941,421.  Specification of Letters Patent.  Patented Nov. 30, 1909.

Application filed August 23, 1909. Serial No. 514,238.

*To all whom it may concern:*

Be it known that we, WIRT N. KILBY and SAMUEL W. KERR, citizens of the United States, residing at Lancaster, in the county of Grant, State of Wisconsin, have invented a new and useful Planter-Shoe Truck, of which the following is a specification.

This invention has relation to trucks for planter shoes, and it consists in the novel construction and arrangement of its parts hereinafter shown and described.

The object of the invention is to provide a truck adapted to be applied to a planter shoe or furrow opener and which sustains the major portion of the weight thereof and travels upon the surface of the ground in such manner as to cause the seed deposited by the planter to enter the soil substantially at uniform depth from the surface thereof.

The truck is provided with an axle which is provided at its ends with journaled wheels inclined at an angle to each other and adapted to travel upon the surface of the soil. Means is provided for varying the space between the shoe and the axle and an adjustable draft means is attached to the axle at one end and to forward portion of the shoe at the other end. The truck wheels are adapted to travel at the opposite sides of the shoe and as indicated they sustain the weight of the major portion of the shoe, and as the shoe passes over ridges and furrows in the ground, the said truck wheels will follow the surfaces of said ridges and furrows, and cause the shoe to do the same, whereby the uniformity of planting as indicated is affected.

An advantage gained by the application of the truck to the planter shoe is that much time and labor is saved incident to replanting for the reason that the uniformity in the deposit of the seed causes a uniformity in the stand of plants and it is not necessary to replant in order to attain a uniform stand of plants which frequently cannot be had without replanting for the reason that the seed is often deposited at unequal distances below the soil and in some cases is deposited in the soil at some points and at the surface of the soil at other points.

In the accompanying drawings, Figure 1 is a side elevation of a planter shoe or furrow opener with the truck applied thereto. Fig. 2 is a top plan view of the same. Fig. 3 is a transverse sectional view of the planter shoe showing the truck applied thereto with parts in section.

In the accompanying drawings the shoe or furrow opener to which the truck is applied is indicated at 1 and the said shoe is of usual form and applied to the planter-frame in any suitable manner. The truck comprises an axle 2 which straddles the intermediate portion of the lower portion of the shoe 1 and which is provided with downwardly and inwardly disposed intermediate portions 3. The said axle 2 terminates in downwardly and outwardly disposed spindles 4. Ground-wheels 5 are journaled for rotation upon the spindles 4 and are provided with beveled peripheries. Caps are attached to the spindles 4 and cover the outer portions of the hubs of the ground wheels 5. Shields 8 are attached to the portions 3 of the axle 2 and lie over the upper inner portions of the hubs of the ground-wheels 5 and are adapted to prevent dirt or grit from entering the interior of the hub.

The axle 2 is provided at a point equidistant between its ends with an opening 9 which is provided in its side with a vertically disposed recess 10. A standard 11 is adjustably mounted in the opening 9 and is provided at one side with a dentate web 12 which lies in the recess 10 in the side of the opening 9. A bolt 13 passes transversely through the recess 10 of the opening 9 and is adapted to enter the spaces between the teeth of the web 12. The end portions of the said bolt 13 are located in openings or perforations provided at the intermediate portion of the axle 2. The standard 12 is provided at its lower end with a recess 14 and a bolt 15 passes transversely through the said recess and also passes through the upper portion of the planter shoe 1.

A draft means is located between the forward side of the axle 2 and the front portion of the planter shoe 1. The said draft means includes links 16 which are pivotally connected at their rear ends with eyes 17 provided upon the inner sides of the portions 3 of the axle 2 and which are adjustably connected at their forward ends by means of bolts 18 with the rear end of a link 19. The link 19 is provided at its forward end with an extremity 20 which lies in a plane approximately parallel with the plane of the major portion of the said link and which is secured pivotally by means of a bolt 21 to the forward portion of the planter shoe 1.

From the above description it is obvious that by adjusting the standard 11 vertically in the opening 9 provided in the axle 2 the said axle may be raised or lowered with relation to the intermediate portion of the planter shoe or conversely the planter shoe may be elevated or depressed with relation to the said axle, and when the parts are in proper position they may be secured in such relation by passing the bolt 13 through its receiving perforations in the axle 2 and registering space between the teeth of the web 12 of the standard 11. Furthermore it will be seen that the draft means may be elongated or contracted by adjustably connecting the links 16 with the link 19 whereby the truck may be adapted to be used upon planter shoes of different lengths. A cross bar 22 is attached to the link 16 and is provided with scraper blades 23 against which the peripheries of the wheels 5 bear as the said wheels rotate upon their axes. Furthermore it will be seen that as the planter shoe moves in a forward direction and opens the furrow in the soil preparatory to dropping the seed from the planter the wheels 5 will travel upon the surface of the soil and cause the shoe to cut a furrow in the soil of uniform depth, consequently the seed which is afterward deposited in the furrow is located at uniform depth below the surface of the soil. As the planter shoe passes transversely over ridges or furrows that might happen to be in the soil, the wheels 5 will follow the contour of the said ridges or furrows and preserve the uniformity in depth of the furrow opened by the planter shoe, as indicated. By reason of the fact that the wheels 5 are disposed in planes at angles to each other and the said wheels have beveled peripheries, they have a tendency to crowd the soil at the side of the furrow opened by the planter shoe toward the edges of the said furrow and consequently there is sufficient soil at the edges or sides of the furrow to effectually cover the seed when the sides of the furrow are broken down by the wheels of the planter in the usual manner.

Thus it will be seen that a simple shoe truck is provided which may be easily and quickly applied to the shoe of any planter irrespective of its length, and may be readily adjusted to cause the planter shoe to open a relatively deep or shallow furrow as desired, and also the truck assures uniformity in depth of planting of the seed and provides means whereby sufficient soil is left at the side of the furrow to effectually cover the seed and nurture the same.

Having thus described the invention what we claim as new and desire to secure by U. S. Letters Patent is;—

1. A planter shoe truck comprising an axle having downwardly and inwardly disposed end portions, and spindle extremities pitched at an angle to each other, ground wheels journaled upon the spindle extremities of the axle, a standard adjustably mounted upon the axle and having means for attachment with the planter shoe, and a draft means for connecting the axle with the planter shoe.

2. A planter shoe truck comprising an axle, ground wheels journaled thereon, said axle having an opening provided at one side with a recess, a standard located in the opening of the axle and having a dentate web located in the recess of the opening, means carried by the standard for attachment with the planter shoe, a bolt passing transversely through portions of the axle and adapted to extend through the spaces of the teeth of said web, and a draft means for connecting the axle with the planter shoe.

In testimony that we claim the foregoing as our own, we have hereto affixed our signatures in the presence of two witnesses.

WIRT N. KILBY.
SAMUEL W. KERR.

Witnesses:
WILLIAM M. KERR,
C. B. ZIEGLAR.